(12) United States Patent
Numata et al.

(10) Patent No.: US 9,312,534 B2
(45) Date of Patent: Apr. 12, 2016

(54) NONAQUEOUS ELECTROLYTIC SOLUTION SECONDARY BATTERY, AND POSITIVE ELECTRODE AND NEGATIVE ELECTRODE USED IN THE SAME

(75) Inventors: Tatsuji Numata, Tokyo (JP); Hiroo Takahashi, Tokyo (JP); Tetsuya Kajita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 137 days.

(21) Appl. No.: 13/991,355

(22) PCT Filed: Dec. 9, 2011

(86) PCT No.: PCT/JP2011/078539
§ 371 (c)(1),
(2), (4) Date: Jun. 3, 2013

(87) PCT Pub. No.: WO2012/077781
PCT Pub. Date: Jun. 14, 2012

(65) Prior Publication Data
US 2013/0252106 A1    Sep. 26, 2013

(30) Foreign Application Priority Data

Dec. 9, 2010 (JP) .................... 2010-274753

(51) Int. Cl.
*H01M 4/131* (2010.01)
*H01M 4/485* (2010.01)
(Continued)

(52) U.S. Cl.
CPC .............. *H01M 4/131* (2013.01); *H01M 4/386* (2013.01); *H01M 4/485* (2013.01); *H01M 4/587* (2013.01); *H01M 4/62* (2013.01); *H01M 10/052* (2013.01); *H01M 4/364* (2013.01); *H01M 4/366* (2013.01);

(Continued)

(58) Field of Classification Search
CPC ..... H01M 4/131; H01M 4/485; H01M 4/525; H01M 10/052; H01M 4/366; H01M 4/386; H01M 4/587; H01M 4/62
See application file for complete search history.

(56) References Cited

U.S. PATENT DOCUMENTS

| 2004/0197654 A1 | 10/2004 | Barker et al. |
| 2007/0072034 A1* | 3/2007 | Barker et al. .................. 429/31 |
| 2007/0160519 A1 | 7/2007 | Barker et al. |
| 2009/0136845 A1* | 5/2009 | Choi et al. .................... 429/212 |
| 2010/0248041 A1 | 9/2010 | Kikuchi et al. |

FOREIGN PATENT DOCUMENTS

| JP | 6-325765 A | 11/1994 |
| JP | 7-192766 A | 7/1995 |

(Continued)

OTHER PUBLICATIONS

International Search Report of PCT/JP2011/078539 dated Mar. 27, 2012.

*Primary Examiner* — Helen O Conley
(74) *Attorney, Agent, or Firm* — Sughrue Mion, PLLC

(57) ABSTRACT

Provided is a nonaqueous electrolytic solution secondary battery having a high energy density, and a positive electrode and a negative electrode used therefor. The nonaqueous electrolytic solution secondary battery includes a positive electrode and a negative electrode, wherein: the negative electrode contains a negative electrode active material having an initial charge/discharge efficiency of 75% or less when charged and discharged by employing metallic Li as a counter electrode; and the positive electrode contains a metal oxide (X) represented by $A_xMeO_y$ (wherein A is Na and/or K, Me is Ni and/or Cu, x satisfies $1.9 \leq x \leq 2.1$, and y satisfies $1.9 \leq y \leq 2.1$).

24 Claims, 1 Drawing Sheet

(51) Int. Cl.
  *H01M 10/052* (2010.01)
  *H01M 4/38* (2006.01)
  *H01M 4/587* (2010.01)
  *H01M 4/62* (2006.01)
  *H01M 4/525* (2010.01)
  *H01M 4/02* (2006.01)
  *H01M 4/36* (2006.01)

(52) U.S. Cl.
  CPC ......... *H01M 4/525* (2013.01); *H01M 2004/021* (2013.01); *Y02E 60/122* (2013.01); *Y02T 10/7011* (2013.01)

(56) References Cited

FOREIGN PATENT DOCUMENTS

| | | |
|---|---|---|
| JP | 2000-502831 A | 3/2000 |
| JP | 2003-123740 A | 4/2003 |
| JP | 2004-47404 A | 2/2004 |
| JP | 2006-514776 A | 5/2006 |
| JP | 2008-532224 A | 8/2008 |
| JP | 2009-76372 A | 4/2009 |
| WO | 2004/095607 A2 | 11/2004 |
| WO | 2006/105253 A2 | 10/2006 |
| WO | 2009/057727 A1 | 5/2009 |

* cited by examiner

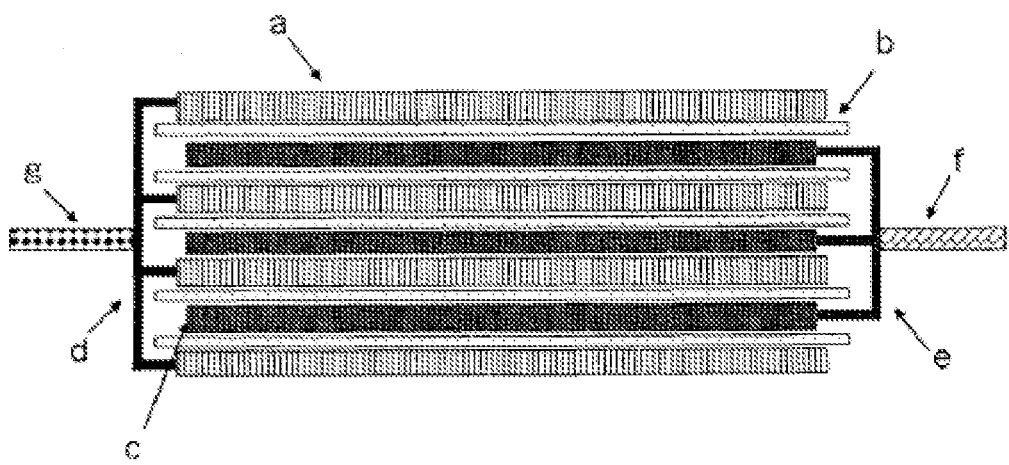

NONAQUEOUS ELECTROLYTIC SOLUTION SECONDARY BATTERY, AND POSITIVE ELECTRODE AND NEGATIVE ELECTRODE USED IN THE SAME

CROSS REFERENCE TO RELATED APPLICATIONS

This is a National Stage of International Application No. PCT/JP2011/078539 filed Dec. 9, 2011, claiming priority based on Japanese Patent Application No. 2010-274753 filed Dec. 9, 2010, the contents of all of which are incorporated herein by reference in their entirety.

TECHNICAL FIELD

The present invention relates to a nonaqueous electrolytic solution secondary battery, as well as a positive electrode and a negative electrode used in the same.

BACKGROUND

A secondary battery having a high energy density is needed as the markets of notebook computer, mobile phone, electric vehicle and the like are rapidly expanded. As a method for obtaining a secondary battery having a high energy density, there has been known a method of using a high capacity negative electrode material, a method of using a nonaqueous electrolytic solution having good stability, or the like.

Silicon oxides or silicates used as negative electrode materials for a secondary battery are disclosed in Patent Document 1. A negative electrode used for a secondary battery provided with an active material layer comprising carbonaceous particles capable of absorbing and emitting lithium ions, metal particles capable of forming an alloy with lithium and oxide particles capable of absorbing and emitting lithium ions is disclosed in Patent Document 2. A negative electrode material used for a secondary battery is disclosed in Patent Document 3 in which the surfaces of particles having a structure with silicon microcrystals dispersed in a silicon compound are coated with carbon.

However, when silicon oxides or complexes of silicon and silicon oxides are used as a negative electrode, Li—Si—O compounds are formed during an initial charge process, so that some of Li from a positive electrode cannot be used in a reversible charge/discharge reaction. Consequently, even though a material having greater capacity than carbon is used for the negative electrode, it is difficult to obtain a secondary battery having a high capacity.

To compensate such an irreversible capacity, a method of pre-adding lithium to a negative electrode material has been known. Patent Document 4 discloses a nonaqueous electrolytic solution secondary battery having lithium added previously by attaching lithium to a portion of negative electrode that is not faced with a positive electrode. Patent Document 5 discloses a nonaqueous secondary battery in which a negative electrode contains a material formed by pre-doping lithium on SiOx ($0.3 \leq x \leq 1.6$). As such, an irreversible capacity is generated due to an irreversible reaction of a negative electrode active material with lithium during an initial charge process and hence lithium absorption. To solve such a problem, by pre-supplementing lithium by an amount corresponding to the irreversible capacity, a reduction in battery capacity after initial charge/discharge may be suppressed, and an energy density of secondary battery may be increased.

Further, as an attempt for compensating such an irreversible capacity of a negative electrode without altering a current battery manufacturing process, a method of adding a Li-rich compound to a positive electrode has been known. Patent Document 6 discloses an electrode comprising a first electrode material having $Li_2NiO_2$ and a second electrode material having $LiTMO_2$ (TM: a transition metal element selected from Ni, Co and Mn). Patent Document 7 discloses a positive electrode active material used for a lithium secondary battery containing a lithium nickel oxide in which some of nickel in $Li_2NiO_2$ is substituted by other elements. Patent document 8 discloses a positive electrode used for a lithium secondary battery containing $Li_2CuO_2$.

PRIOR ART DOCUMENTS

Patent Documents

Patent Document 1: JP Patent Application Publication No. Hei 6-325765
Patent Document 2: JP Patent Application Publication No. 2003-123740
Patent Document 3: JP Patent Application Publication No. 2004-47404
Patent Document 4: JP Patent Application Publication No. Hei 7-192766
Patent Document 5: JP Patent Application Publication No. 2009-76372
Patent Document 6: JP Patent Application Publication No. 2000-502831
Patent Document 7: JP Patent Application Publication No. 2006-514776
Patent Document 8: JP Patent Application Publication No. 2008-532224

SUMMARY OF THE INVENTION

Problems to be Solved by the Invention

However, said methods of adding previously lithium to a negative electrode material have problems such as complicated manufacturing processes, high production costs, and control difficulty of doping amount and rate in doping lithium on a negative electrode material. Thus, it is difficult to design the desired cell. Further, there is a large hurdle to interrupt mass production such as wrinkle or breakage generated in electrodes. In addition, since Li-rich compounds exhibit challenges in synthesizing them, high moisture absorption and low workability, said method of adding a Li-rich compound to a positive electrode has also a large hurdle to interrupt mass production.

According to the present invention, it is provided a nonaqueous electrolytic solution secondary battery having a high energy density, and a positive electrode and a negative electrode used therefor.

Means to Solve the Problems

According to the present invention, a nonaqueous electrolytic solution secondary battery includes a positive electrode and a negative electrode, wherein the negative electrode contains a negative electrode active material having an initial charge/discharge efficiency of 75% or less when charged and discharged by employing metallic Li as a counter electrode, and the positive electrode contains a metal oxide (X) represented by $A_xMeO_y$ (wherein A is at least one or two species selected from Na and K, Me is at least one or two species selected from Ni and Cu, x satisfies $1.9 \leq x \leq 2.1$, and y satisfies $1.9 \leq y \leq 2.1$).

According to the present invention, a positive electrode used for a nonaqueous electrolytic solution secondary battery includes a metal oxide (X) represented by $A_xMeO_y$ (wherein A is at least one selected from Na and K, Me is at least one selected from Ni and Cu, x satisfies $1.9 \le x \le 2.1$, and y satisfies $1.9 \le y \le 2.1$).

According to the present invention, a negative electrode used for a nonaqueous electrolytic solution secondary battery includes a negative electrode active material having an initial charge/discharge efficiency of 75% or less when charged and discharged by employing metallic Li as a counter electrode, wherein the negative electrode is obtained by charging with a positive electrode containing a metal oxide (X) represented by $A_xMeO_y$ (wherein A is at least one or two species selected from Na and K, Me is at least one or two species selected from Ni and Cu, x satisfies $1.9 \le x \le 2.1$, and y satisfies $1.9 \le y \le 2.1$) as a counter electrode.

Effect of the Invention

According to the present invention, a nonaqueous electrolytic solution secondary battery having a high energy density, as well as a positive electrode and a negative electrode used therefor can be provided.

BRIEF DESCRIPTION OF THE DRAWING

FIG. 1 is a schematic view showing an example of a nonaqueous electrolytic solution secondary battery according to the present invention.

DESCRIPTION OF EMBODIMENTS

Hereinafter, the present invention will be described in detail.

According to the present invention, for example, a secondary battery has an electrode device having a positive electrode and a negative electrode disposed opposite each other and an electrolytic solution contained in a casing.

[1] Positive Electrode

A positive electrode contains a metal oxide (X) represented by $A_xMeO_y$ (wherein A is any one selected from Na and K, Me is any one selected from Ni and Cu, x satisfies $1.9 \le x \le 2.1$, and y satisfies $1.9 \le y \le 2.1$). The metal oxide (X) contained in the positive electrode emits Na and/or K ions (these ions are also referred to as A ions) during an initial charge. These A ions are moved into a negative electrode. For example, when silicon oxide is used as a negative electrode active material, A ions are binded to oxygen in silicon oxide to form A-Si—O compounds (it is also referred to as silicon oxide A salts). When the metal oxide (X) is not contained in a positive electrode active material, an amount of lithium corresponding to A salt in a silicon oxide A salt cannot be involved in a reversible reaction. Due to the metal oxide (X) contained in a positive electrode active material, an amount of lithium that reacts irreversibly with a negative electrode active material can be reduced, and simultaneously the total weight of positive electrode can be reduced. As a result, an energy density per weight of a secondary battery can be improved. Also, since A ion has ionic radius larger than that of Li ion, Li ions may be better diffused and a change in thickness of electrodes involved in a reaction for Li—Si formation may be reduced. Therefore, the charge/discharge cycle or rate property of a secondary battery may be improved.

Specific examples of the metal oxide (X) represented by AxMeOy may include $Na_2NiO_2$, $Na_2CuO_2$, $K_2NiO_2$, or $K_2CuO_2$. Ni or Cu serving as Me may be in the form of solid solution. Also, some of A sites may be substituted by other alkali metals or alkali earth metals, and some of Me sites may be substituted by other metals.

For example, such a positive electrode is formed by covering a positive electrode current collector with a desired positive electrode active material (Z) and a metal oxide (X) together with a biding agent suitable for the positive electrode. Particular examples of positive electrode active material (Z) include $LiMO_2$ (M is at least one selected from Ni, Co, Al, Mn and Fe), $LiMn_2O_4$ (Mn may be partially substituted by other transition metals, alkali metals or alkali earth metals, or O may be partially substituted by halogen atoms such as F, Cl and the like), lithium phosphates such as $LiFePO_4$, $LiMnPO_4$ or the like (O may be partially substituted by F), composites such as $Li_2[Mn,Fe]SiO_4$ and $Li_2MnO_3$—$LiMO_2$ (M is defined as above), $Li_2FeP_2O_7$ or the like. More particularly, it is preferred to use $Li_\alpha Ni_\beta Co_\gamma Al_\delta O_2$ ($1 \le \alpha \le 1.2$, $\beta+\gamma+\delta=1$, $0.7 \le \beta < 1$, $0 < \gamma \le 0.2$, $0 \le \delta < 0.3$) or $Li_\alpha Ni_\beta Co_\gamma Mn_\delta O_2$ ($1 \le \alpha \le 1.2$, $\beta+\gamma+\delta=1$, $0.6 \le \beta < 1$, $0 < \gamma \le 0.2$, $0 \le \delta < 0.4$). These positive-electrode active materials may be used alone or in any combination of two or more species.

As a binding agent for positive electrode, polyfluorovinylidene, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide or the like may be used. Among these, it is preferred to use polyfluorovinylidene in terms of various utility or low costs. A content of the binding agent for positive electrode used is preferably in the range of 2-10 parts by weight with respect to 100 parts by weight of positive electrode active material in terms of 'sufficient adhesion' and 'high energization' which are traded off each other.

As the positive electrode current collector, it is preferred to use aluminum or SUS in terms of electrochemical stability. Aluminum is particularly preferred. The positive electrode current collector may have a shape such as a foil, a plate or a mesh.

To reduce impedance, an electroconductive assisting agent may be added to a positive electrode active material layer containing a positive electrode active material. As such an electroconductive assisting agent, carbonaceous fine particles such as graphite, carbon black or acetylene black may be used.

[2] Negative Electrode

A negative electrode contains a negative electrode active material having an initial charge/discharge efficiency of 75% or less when charged and discharged by employing metallic Li as a counter electrode. For example, such a negative electrode is formed by covering a negative electrode current collector with a desired negative electrode active material together with a biding agent suitable for the negative electrode. As a negative electrode active material, a metal oxide (a) capable of absorbing and emitting lithium ions may be used. Additionally, a metal capable of forming an alloy with lithium (b) or a carbon material (c) may further be used. Also, the negative electrode is obtained by chagrining with a positive electrode containing the metal oxide (X) as a counter electrode. That is, for example, when a silicon oxide is used as a negative electrode active material, a A-Si—O compound is formed in the negative electrode.

As the metal oxide (a), silicon oxides, aluminum oxides, tin oxides, indium oxides, zinc oxides, lithium oxides, or any composites thereof may be used. Particularly, the metal oxide (a) is preferred to include silicon oxides. This is because silicon oxides are not well reacted with other compounds since silicon oxides are relatively stable. In addition, to the metal oxide (a), one or two or more elements selected from nitrogen, boron and sulfur may be added at an amount of for example 0.1-5 wt %. Thus, the electrical conductivity of the metal oxide (a) may be increased.

As the metal (b), Al, Si, Pb, Sn, In, Bi, Ag, Ba, Ca, Hg, Pd, Pt, Te, Zn, La, or alloys of two or more metals among these may be used. Particularly, the metal (b) is preferred to include silicon (Si). Also, the metal (b) is preferably the same as a metal element of the metal oxide (a).

As the carbon material (c), graphite, amorphous carbons, diamond-like carbons, carbon nanotubes, or any composites thereof may be used. Particularly, graphite of high crystallinity shows a high electrical conductivity, good adhesion to a negative electrode current collector made of a metal such as copper and good voltage flatness. To the contrary, amorphous carbons of low crystallinity show relatively low volume expansion and therefore they have an effect of relieving a volume expansion throughout a negative electrode and also may avoid deterioration due to unevenness such as grain boundaries or defects.

A negative electrode active material in which the metal oxide (a), the metal (b) and the carbon material (c) are mixed may be prepared, for example using a method as disclosed in Patent Document 3. That is, a composite having a surface coated with the carbon material (c) and forming nanoclusters by the metal (b) in the metal oxide (a) may be obtained by performing CVD treatment to the metal oxide (a) under an atmosphere comprising an organic gas such as methane. The negative electrode active material may also be prepared by mixing the carbon material (c), the metal (b) and the metal oxide (c) by means of mechanical milling.

A content of each of the metal oxide (a), the metal (b) and the carbon material (c) is not particularly limited. A content of the metal oxide (a) is preferably between 5 wt % and 90 wt %, and more preferably between 40 wt % and 70 wt % with respect to the total weight of the metal oxide (a), the metal (b) and the carbon material (c). A content of the metal (b) is preferably between 5 wt % and 90 wt %, and more preferably between 20 wt % and 50 wt % with respect to the total weight of the metal oxide (a), the metal (b) and the carbon material (c). A content of the carbon material (c) is preferably between 2 wt % and 50 wt %, and more preferably between 2 wt % and 30 wt % with respect to the total weight of the metal oxide (a), the metal (b) and the carbon material (c).

As a binding agent for negative electrode, polyfluorovinylidene, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide or the like may be used. Among these, it is preferred to use polyimide or polyamideimide since they have high adhesion property. A content of the binding agent for negative electrode used is preferably in the range of 5-25 parts by weight with respect to 100 parts by weight of negative electrode active material in terms of 'sufficient adhesion' and 'high energization' which are traded off each other.

As a negative electrode current collector, it is preferred to use nickel, copper, or any alloys thereof in terms of electrochemical stability. Nickel is particularly preferred. The negative electrode current collector may have a shape such as a foil, a plate or a mesh.

The negative electrode may be fabricated by forming a negative electrode active material layer comprising a negative electrode active material and a binding agent for negative electrode onto a negative electrode current collector. As a method for forming the negative electrode active material layer, a doctor blade method, a die coater method, a CVD method, a sputtering method or the like may be used. Alternatively, the negative electrode active material layer is firstly formed, and subsequently the negative electrode current collector may be formed by generating a thin film from aluminum, nickel or any alloys thereof using a method such as vapor deposition or sputtering.

[3] Electrolytic solution

Nonaqueous electrolytic solutions dissolving supporting salts in a nonaqueous solvent may be used as an electrolytic solution.

Examples of such nonaqueous solvents include cyclic carbonates such as propylene carbonate (PC), ethylene carbonate (EC), butylene carbonate (BC), vinylene carbonate (VC) or the like; linear carbonates such as dimethylcarbonate (DMC), diethylcarbonate (DEC), ethylmethylcarbonate (EMC), dipropylcarbonate (DPC) or the like; aliphatic carboxylic acid esters such as methyl formate, methyl acetate, ethyl propionate or the like; γ-lactones such as γ-butyrolactone or the like; chain-type ethers such as 1,2-ethoxyethane (DEE), ethoxymethoxyethane (EME) or the like; cyclic ethers such as tetrahydrofuran, 2-methyltetrahydrofuran or the like; or aprotic organic solvents such as dimethylsulfoxide, 1,3-dioxolane, dioxolane derivatives, formamide, acetoamide, dimethylformamide, acetonitrile, propionitrile, nitromethane, ethylmonoglyme, triester phosphate, trimethoxymethane, sulforane, methylsulforane, 1,3-dimethyl-2-imidazolinone, 3-methyl-2-oxazolidinone, propylcarbonate derivatives, tetrahydrofuran derivatives, ethylether, 1,3-propanesulfone, anisole, N-methylpyrrolidone or the like. These nonaqueous solvents may be used alone or in any combination of two or more species.

As supporting salts dissolved in a nonaqueous solvent, lithium salts such as $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(C_2F_5SO_2)_2$, $LiB_{10}Cl_{10}$, lithium lower aliphatic carboxylate, lithium chloroborane, lithium tetraphenylborate, lithium bis(oxalate)borate (LiBOB), LiBr, LiI, LiSCN, LiCl, imides, or the like may be used. These supporting salts may be used alone or in any combination of two or more species.

To these nonaqueous electrolytic solutions, various additives may be properly added. Also, polymer electrolytes may be used instead of nonaqueous electrolytic solutions.

[4] Separator

As the separator, a porous film or non-woven fabric made of polypropylene, polyethylene, composites thereof, polyimide or the like may be used. In addition, a laminate formed from these materials or a composite of these materials with seramic to improve heat resistance may be used as the separator.

[5] Casing

Any of casings may be used as long as it is stable in the electrolyte and has enough moisture barrier property. For example, as the casings for layered laminate type secondary batteries, laminate film formed from aluminum, silica-coated polypropylene, polyethylene and the like may be used. Particularly, it is preferred to use an aluminum laminate film in terms of inhibiting a volume expansion.

In case of a secondary battery using a laminate film as a casing, the collapse of electrode device is increased upon generating gases when compared to a secondary battery using a metal can as a casing. This is because the laminate film may easily be deformed by the internal pressure of secondary battery relative to the metal can. In addition, a secondary battery using a laminate film casing is sealed without a spare space therein so that the internal pressure of battery is maintained at a value lower than atmospheric pressure. Therefore, the generated gases may lead to a volume variation of battery or a deformation of electrode device directly.

However, according to embodiments of the present invention, it is provided a secondary battery that can overcome these problems. Therefore, a lithium secondary battery, particularly a lithium ion secondary battery of layered laminate type may be provided at low costs, and also the provided secondary battery has good flexibility in the design of a cell capacity depending on varying the number of layers stacked.

[6] Secondary Battery

A secondary battery may have a shape of any one of cylindrical, planar winding rectangular, layered rectangular, coin, planar winding laminate, layered laminate or card types, and the layered laminate type is preferred.

FIG. 1 is a schematic view showing a layered laminate type secondary battery. The electrode device has a structure in which a plurality of positive electrodes (c) and a plurality of negative electrodes (a) are alternately stacked onto each other, a plurality of separators (b) being placed between each positive electrode and each negative electrode. A positive electrode current collector (e) provided in each positive electrode is electrically connected with the matched positive electrode via welding at an end without coating with a positive electrode active material, and a positive electrode terminal (f) is also welded at the welding point. A negative electrode current collector (d) provided in each negative electrode is electrically connected with the matched negative electrode via welding at an end without coating with a negative electrode active material, and a negative electrode terminal (g) is also welded at the welding point.

Since electrode devices of a layered plane structure have no area where a radius of curvature is small (an area close to the core of a winding structure), they have an advantage that the volume of electrode is not affected by charge/discharge as compared with electrode devices having a winding structure. That is, this structure is effectively applicable to electrode devices using active materials susceptible to volume expansion. To the contrary, since electrode devices of a winding structure have a curved configuration, a volume variation may collapse the structure. Particularly, when a negative electrode active material volume such as silicon oxides, a volume of which is largely changed during charge/discharge, is used, a secondary battery using an electrode device having a winding structure exhibits a large capacity reduction during charge/discharge.

However, in cases of electrode devices having a plane laminate structure, there is a problem that gases generated between electrodes may remain in that place. This is because a distance between electrodes may easily become wide in electrode devices having a laminate structure, while a distance between electrodes is hard to be widened due to tension applied to electrodes in electrode devices having a winding structure. When using a laminate film as a casing, this problem is particularly significant.

By the present invention, the foregoing problems can be solved, and a layered laminate type lithium ion secondary battery using a high energy negative electrode can be operated for a prolonged period.

EXAMPLES

Hereinafter, embodiments according to the present invention will be described in detail with reference to examples.

Experiment 1

Examples 1 to 10, Comparative Examples 1 to 4

Preparation of $Na_2NiO_2$ Particles

Hydrate of $Na_2CO_3$ (manufactured by Wako Pure Chemical Industries Ltd.) was heated at 300° C. for 12 hr to obtain an anhydrous salt of $Na_2CO_3$. Then, the resulting $Na_2CO_3$ anhydrous salt was mixed with NiO powder (manufactured by Kanto Chemical Co., Inc.), and the mixture was calcined at 550° C. for 24 hr under $N_2$ atmosphere to obtain $Na_2NiO_2$ particles. The resulting particles were confirmed as $Na_2NiO_2$ by X-ray powder diffraction.

(Fabrication of Test Cell)

90 parts by weight of a mixture of positive electrode active material (Z) particles and $Na_2NiO_2$ particles as the metal oxide (X), 5 parts by weight of polyfluorovinylidene as a binder and 5 parts by weight of acetylene black as an electroconductive agent were mixed. Additionally, NMP was added as a solvent to dissolve and disperse the resulting mixture and to prepare slurry. This slurry was used as a material for a positive electrode. As the positive electrode active material (Z) particles, as shown in Table 1, any one of $LiNi_{0.8}Co_{0.2}O_2$ particles (average particle diameter D50:10.5 μm), $LiCoO_2$ particles (average particle diameter D50:12 μm) or $Li[Ni_{1/3}Co_{1/3}Mn_{1/3}]O_2$ particles (average particle diameter D50:8.9 μm) was used. Also, a ratio by which the positive electrode active material (Z) particles and $Na_2NiO_2$ particles are mixed was adjusted such that $Na_2NiO_2$ particles meet x % by weight shown in Table 1 with respect to the total weight of both particles. This slurry was applied on an Al metal foil having 20 μm thickness, dried, pressed at an electrode density of 3.0 g/cm³ using a roll press machine, and cut at 80 mm×160 mm size to fabricate a positive electrode.

Also, 80 parts by weight of negative electrode active material particles, 15 parts by weight of a polyamic acid-NMP solution as a binder solution (as weight of polyimide finally obtained), and 3 parts by weight of acetylene black and 2 parts by weight of fibrous graphite as electroconductive agents were mixed. Additionally, NMP was added as a solvent to dissolve and disperse the resulting mixture and to prepare slurry. This slurry was used as a material for a negative electrode. As the negative electrode active material particles, as shown in Table 1, SiO particles (manufactured by Osaka Titanium technologies Co., Ltd.; Si and $SiO_2$ complexed as fine sizes less than several hundreds nm; average particle diameter D50:11.5 μm), or SiOC particles (complexed SiO particles and carbon; average particle diameter D50:11.6 μm) was used. As the SiOC particles, for example, SiO particles having carbon deposited by CVD, SiO particles treated by heat after pitch treatment, SiO particles coated with ultragranule carbon, or SiO particles treated by heat after sugar attachment may be used. This slurry was applied on a Cu metal foil having 25 μm thickness, dried at 125° C. for 5 min under $N_2$ atmosphere, and cut at 82 mm×162 mm size to fabricate a negative electrode (electrode density: 1.01 g/cm³).

Three positive electrodes and four negative electrodes obtained above were alternately stacked with porous polypropylene films sandwiched between each positive electrode and each negative electrode as a separator. The ends of positive electrode and negative electrode current collectors without coating with the corresponding active materials were each welded. Additionally, an aluminum positive electrode terminal and a nickel negative electrode terminal were each welded at the corresponding welding point. Thus, an electrode device having a plane shape layered structure was obtained.

The resulting electrode device was wrapped with an aluminum laminate film as a casing and three sides were sealed. Then, the electrode device was dried at 85° C. for 24 hr under reduced pressure and an electrolytic solution was injected. As the electrolytic solution, a solution dissolving $LiPF_6$ at the concentration of 1M in a nonaqueous electrolytic solution comprising EC/DEC at the ratio of 30/70 (by volume) was used. Finally, the remaining one side was sealed to obtain a test cell.

(Cell Evaluation)

Energy Density (20° C.)

The cell was charged to upper limit voltage 4.2V, and further charged at constant voltage 4.2V for 5 hr. Subsequently, the cell was discharged to lower limit voltage 2.7V at constant current 400 mA. This charge/discharge cycle was twice repeated. Energy (Wh) of the cell was calculated from discharge capacity and voltage change at the second discharge. Separately, weight (kg) of the cell was measured to calculate an energy density (Wh/kg) of the cell.

1Cd/0.2CdC Rate (20° C.)

Firstly, 90% of the second discharge capacity was defined as 1C capacity of the cell and a current value for 1C capacity was calculated. Then, the cell was charged to upper limit voltage 4.2V at a constant current corresponding to 0.2C capacity, and further charged at constant voltage 4.2V (the total charge period of 2.5 hr). Subsequently, the cell was discharged to lower limit voltage 2.7V at a constant current corresponding to 1C capacity to determine discharge capacity (1Cd). Also, the cell was discharged using the same method at a constant current corresponding to 0.2C capacity to determine discharge capacity (0.2Cd). Finally, capacity rate (%) of 1Cd/0.2Cd was calculated.

Capacity Maintenance (20° C.)

Cycle evaluation was performed on the cell previously evaluated on said energy density and 1Cd/0.2Cd rate. More particularly, the cell was charged to upper limit voltage 4.2V at a constant current corresponding to 1C capacity, and further charged at constant voltage 4.2V (the total charge period of 2.5 hr). Subsequently, the cell was discharged to lower limit voltage 2.7V at a constant current corresponding to 1C capacity. This charge/discharge cycle was 300 times repeated. Afterward, discharge capacity maintenance (%) at 300th cycles was calculated with respect to the initial discharge capacity of 100%.

TABLE 1

| | Positive electrode active material | Metal Oxide (X) | X (wt %) | Negative electrode active material | Energy density (Wh/mg) | $1C^d/0.2C^d$ rate (%) | Capacity maintenance (%) |
|---|---|---|---|---|---|---|---|
| Example 1 | $LiNi_{0.8}Co_{0.2}O_2$ | $Na_2NiO_2$ | 2 | SiO | 151 | 87 | 84 |
| Example 2 | $LiNi_{0.8}Co_{0.2}O_2$ | $Na_2NiO_2$ | 5 | SiO | 153 | 88 | 86 |
| Example 3 | $LiNi_{0.8}Co_{0.2}O_2$ | $Na_2NiO_2$ | 10 | SiO | 155 | 89 | 86 |
| Example 4 | $LiNi_{0.8}Co_{0.2}O_2$ | $Na_2NiO_2$ | 15 | SiO | 157 | 90 | 88 |
| Example 5 | $LiNi_{0.8}Co_{0.2}O_2$ | $Na_2NiO_2$ | 20 | SiO | 149 | 86 | 85 |
| Example 6 | $LiNi_{0.8}Co_{0.2}O_2$ | $Na_2NiO_2$ | 25 | SiO | 136 | 78 | 84 |
| Example 7 | $LiNi_{0.8}Co_{0.2}O_2$ | $Na_2NiO_2$ | 30 | SiO | 128 | 75 | 84 |
| Example 8 | $LiNi_{0.8}Co_{0.2}O_2$ | $Na_2NiO_2$ | 10 | SiOC | 135 | 93 | 86 |
| Example 9 | $LiCoO_2$ | $Na_2NiO_2$ | 10 | SiO | 126 | 87 | 81 |
| Example 10 | $Li[Ni_{1/3}Co_{1/3}Mn_{1/3}]O_2$ | $Na_2NiO_2$ | 10 | SiO | 124 | 82 | 83 |
| Comp. Example 1 | $LiNi_{0.8}Co_{0.2}O_2$ | — | — | SiO | 148 | 85 | 81 |
| Comp. Example 2 | $LiNi_{0.8}Co_{0.2}O_2$ | — | — | SiOC | 130 | 89 | 83 |
| Comp. Example 3 | $LiCoO_2$ | — | — | SiO | 122 | 83 | 75 |
| Comp. Example 4 | $Li[Ni_{1/3}Co_{1/3}Mn_{1/3}]O_2$ | — | — | SiO | 120 | 79 | 76 |

From said results, it was demonstrated that the energy density was increased in positive electrodes containing $Na_2NiO_2$ regardless of positive electrode active material used. Also, it was demonstrated that the content of $Na_2NiO_2$ was preferably 2 to 20 wt % with respect to the total weight of positive electrode materials. When the content of $Na_2NiO_2$ was 25 wt % or more, a tendency to decrease the energy density was exhibited. It is believed that this is because "a demerit due to a reduction in weight of active materials acting atually in a positive electrode" exceeds "an effect due to a reduction in total weight of the positive electrode".

Experiment 2

Examples 11 to 20, Comparative Examples 5 to 8

Preparation of $Na_2CuO_2$ Particles

Cu (manufactured by Kanto Chemical Co., Inc.) was mixed with $Na_2O$ (manufactured by Wako Pure Chemical Industries Ltd.) under Ar atmosphere to fabricate a pellet having ϕ 15 mm×2 mm thickness. Then, the resulting pellet was calcined at 400° C. for 72 hr under $N_2$ atmosphere to obtain $Na_2CuO_2$ particles. The resulting particles were confirmed as $Na_2CuO_2$ by X-ray powder diffraction.

(Fabrication of Test Cell)

A test cell was fabricated using the same method as in Experiment 1 except for using $Na_2CuO_2$ particles as the metal oxide (X).

(Cell Evaluation)

The cell obtained above was evaluated using the same method as in Experiment 1.

TABLE 2

| | Positive electrode active material | Metal Oxide (X) | X (wt %) | Negative electrode active material | Energy density (Wh/mg) | $1C^d/0.2C^d$ rate (%) | Capacity maintenance (%) |
|---|---|---|---|---|---|---|---|
| Example 11 | $LiNi_{0.8}Co_{0.2}O_2$ | $Na_2CuO_2$ | 2 | SiO | 152 | 87 | 83 |
| Example 12 | $LiNi_{0.8}Co_{0.2}O_2$ | $Na_2CuO_2$ | 5 | SiO | 154 | 88 | 84 |
| Example 13 | $LiNi_{0.8}Co_{0.2}O_2$ | $Na_2CuO_2$ | 10 | SiO | 157 | 90 | 86 |
| Example 14 | $LiNi_{0.8}Co_{0.2}O_2$ | $Na_2CuO_2$ | 15 | SiO | 160 | 92 | 88 |
| Example 15 | $LiNi_{0.8}Co_{0.2}O_2$ | $Na_2CuO_2$ | 20 | SiO | 148 | 83 | 84 |
| Example 16 | $LiNi_{0.8}Co_{0.2}O_2$ | $Na_2CuO_2$ | 25 | SiO | 135 | 77 | 84 |
| Example 17 | $LiNi_{0.8}Co_{0.2}O_2$ | $Na_2CuO_2$ | 30 | SiO | 122 | 72 | 83 |
| Example 18 | $LiNi_{0.8}Co_{0.2}O_2$ | $Na_2CuO_2$ | 10 | SiOC | 137 | 94 | 87 |
| Example 19 | $LiCoO_2$ | $Na_2CuO_2$ | 10 | SiO | 129 | 87 | 78 |
| Example 20 | $Li[Ni_{1/3}Co_{1/3}Mn_{1/3}]O_2$ | $Na_2CuO_2$ | 10 | SiO | 127 | 83 | 81 |
| Comp. Example 5 | $LiNi_{0.8}Co_{0.2}O_2$ | — | — | SiO | 148 | 85 | 81 |
| Comp. Example 6 | — | — | — | SiOC | 130 | 89 | 83 |
| Comp. Example 7 | $LiCoO_2$ | — | — | SiO | 122 | 83 | 75 |
| Comp. Example 8 | $Li[Ni_{1/3}Co_{1/3}Mn_{1/3}]O_2$ | — | — | SiO | 120 | 79 | 76 |

From said results, it was demonstrated that the energy density was increased in positive electrodes containing $Na_2CuO_2$ regardless of positive electrode active material used. Also, it was demonstrated that the content of $Na_2CuO_2$ was preferably 2 to 15 wt % with respect to the total weight of positive electrode materials. When the content of $Na_2CuO_2$ was 20 wt % or more, a tendency to decrease the energy density was exhibited. It is believed that this is because "a demerit due to a reduction in weight of active materials acting atually in a positive electrode" exceeds "an effect due to a reduction in total weight of the positive electrode".

Experiment 3

Examples 21 to 30, Comparative Examples 9 to 12

Preparation of $K_2NiO_2$ Particles

NiO (manufactured by Kanto Chemical Co., Inc.) was mixed with $K_2CO_3$ (manufactured by Wako Pure Chemical Industries Ltd.), and the resulting mixture was calcined at 700° C. for 48 hr under $N_2$ atmosphere to obtain $K_2NiO_2$ particles. The resulting particles were confirmed as $Na_2CuO_2$ by X-ray powder diffraction.

(Fabrication of Test Cell)

A test cell was fabricated using the same method as in Experiment 1 except for using $K_2NiO_2$ particles as the metal oxide (X).

(Cell Evaluation)

The cell obtained above was evaluated using the same method as in Experiment 1.

TABLE 3

| | Positive electrode active material | Metal Oxide (X) | X (wt %) | Negative electrode active material | Energy density (Wh/mg) | $1C^d/0.2C^d$ rate (%) | Capacity maintenance (%) |
|---|---|---|---|---|---|---|---|
| Example 21 | $LiNi_{0.8}Co_{0.2}O_2$ | $K_2NiO_2$ | 2 | SiO | 149 | 86 | 84 |
| Example 22 | $LiNi_{0.8}Co_{0.2}O_2$ | $K_2NiO_2$ | 5 | SiO | 149 | 86 | 86 |
| Example 23 | $LiNi_{0.8}Co_{0.2}O_2$ | $K_2NiO_2$ | 10 | SiO | 149 | 86 | 86 |
| Example 24 | $LiNi_{0.8}Co_{0.2}O_2$ | $K_2NiO_2$ | 15 | SiO | 146 | 86 | 88 |
| Example 25 | $LiNi_{0.8}Co_{0.2}O_2$ | $K_2NiO_2$ | 20 | SiO | 145 | 83 | 85 |
| Example 26 | $LiNi_{0.8}Co_{0.2}O_2$ | $K_2NiO_2$ | 25 | SiO | 139 | 80 | 84 |
| Example 27 | $LiNi_{0.8}Co_{0.2}O_2$ | $K_2NiO_2$ | 30 | SiO | 127 | 72 | 84 |
| Example 28 | $LiNi_{0.8}Co_{0.2}O_2$ | $K_2NiO_2$ | 10 | SiOC | 131 | 90 | 86 |
| Example 29 | $LiCoO_2$ | $K_2NiO_2$ | 10 | SiO | 123 | 84 | 81 |
| Example 30 | $Li[Ni_{1/3}Co_{1/3}Mn_{1/3}]O_2$ | $K_2NiO_2$ | 10 | SiO | 121 | 80 | 83 |
| Comp. Example 9 | $LiNi_{0.8}Co_{0.2}O_2$ | — | — | SiO | 148 | 85 | 81 |
| Comp. Example 10 | — | — | — | SiOC | 130 | 89 | 83 |
| Comp. Example 11 | $LiCoO_2$ | — | — | SiO | 122 | 83 | 75 |
| Comp. Example 12 | $Li[Ni_{1/3}Co_{1/3}Mn_{1/3}]O_2$ | — | — | SiO | 120 | 79 | 76 |

From said results, it was demonstrated that the energy density was increased in positive electrodes containing $K_2NiO_2$ regardless of positive electrode active material used. However, the effect of $K_2NiO_2$ is less relative to positive electrodes containing $Na_2NiO_2$. Also, it was demonstrated that the content of $K_2NiO_2$ was preferably 2 to 10 wt % with respect to the total weight of positive electrode materials. When the content of $K_2NiO_2$ was 15 wt % or more, a tendency to decrease the energy density was exhibited. It is believed that this is because "a demerit due to a reduction in weight of active materials acting atually in a positive electrode" exceeds "an effect due to a reduction in total weight of the positive electrode".

Experiment 4

Examples 31 to 40, Comparative examples 13 to 16

Preparation of $K_2CuO_2$ Particles

CuO (manufactured by Wako Pure Chemical Industries Ltd.) was dispersed in a KOH solution (1 mol/L solution of KOH in water; KOH is manufactured by Kanto Chemical Co., Inc.), and the dispersion was maintained at 30° C. for 5 days. The precipitates were dried in vacuum at 100° C. for 12 hr to obtain $K_2CuO_2$ particles. The resulting particles were confirmed as $Na_2CuO_2$ by X-ray powder diffraction.
(Fabrication of Test Cell)
A test cell was fabricated using the same method as in Experiment 1 except for using $K_2CuO_2$ particles as the metal oxide (X).
(Cell Evaluation)
The cell obtained above was evaluated using the same method as in Experiment 1.

weight of active materials acting atually in a positive electrode" exceeds "an effect due to a reduction in total weight of the positive electrode".

The present invention incorporates all disclosure described in JP Patent Application No. 2010-274753.

INDUSTRIAL APPLICABILITY

A lithium secondary battery according to the present invention can be used in all industrial areas for which electric power is necessary, and any industrial area to which the transfer, storage and supply of electric energy is related. Particularly, the present invention can be used as power for mobile devices such as mobile phones, notebook computers or the like; power for travel/transfer means such as tanks, satellites, submarines or the like, including motor vehicles such as electric cars, hybrid cars, electric powered bikes, electric powered bicycles or the like; power for backup of UPS or the like; power storage facilities for storing electric power generated by solar photovoltaic generation, wind power generation or the like; or the like.

DESCRIPTION OF REFERENCE MARKS a: negative electrode
b: separator
c: positive electrode
d: negative electrode current collector
e: positive electrode current collector
f: positive electrode terminal
g: negative electrode terminal
The invention claimed is:
1. A nonaqueous electrolytic solution secondary battery comprising a positive electrode and a negative electrode,

TABLE 4

| | Positive electrode active material | Metal Oxide (X) | X (wt %) | Negative electrode active material | Energy density (Wh/mg) | $1C^d/0.2C^d$ rate (%) | Capacity maintenance (%) |
|---|---|---|---|---|---|---|---|
| Example 31 | $LiNi_{0.8}Co_{0.2}O_2$ | $K_2CuO_2$ | 2 | SiO | 150 | 87 | 86 |
| Example 32 | $LiNi_{0.8}Co_{0.2}O_2$ | $K_2CuO_2$ | 5 | SiO | 150 | 86 | 85 |
| Example 33 | $LiNi_{0.8}Co_{0.2}O_2$ | $K_2CuO_2$ | 10 | SiO | 149 | 86 | 85 |
| Example 34 | $LiNi_{0.8}Co_{0.2}O_2$ | $K_2CuO_2$ | 15 | SiO | 149 | 86 | 84 |
| Example 35 | $LiNi_{0.8}Co_{0.2}O_2$ | $K_2CuO_2$ | 20 | SiO | 149 | 85 | 83 |
| Example 36 | $LiNi_{0.8}Co_{0.2}O_2$ | $K_2CuO_2$ | 25 | SiO | 138 | 79 | 83 |
| Example 37 | $LiNi_{0.8}Co_{0.2}O_2$ | $K_2CuO_2$ | 30 | SiO | 129 | 74 | 83 |
| Example 38 | $LiNi_{0.8}Co_{0.2}O_2$ | $K_2CuO_2$ | 10 | SiOC | 132 | 91 | 85 |
| Example 39 | $LiCoO_2$ | $K_2CuO_2$ | 10 | SiO | 123 | 84 | 78 |
| Example 40 | $Li[Ni_{1/3}Co_{1/3}Mn_{1/3}]O_2$ | $K_2CuO_2$ | 10 | SiO | 122 | 80 | 81 |
| Comp. Example 13 | $LiNi_{0.8}Co_{0.2}O_2$ | — | — | SiO | 148 | 85 | 81 |
| Comp. Example 14 | | — | — | SiOC | 130 | 89 | 83 |
| Comp. Example 15 | $LiCoO_2$ | — | — | SiO | 122 | 83 | 75 |
| Comp. Example 16 | $Li[Ni_{1/3}Co_{1/3}Mn_{1/3}]O_2$ | — | — | SiO | 120 | 79 | 76 |

From said results, it was demonstrated that the energy density was increased in positive electrodes containing $K_2CuO_2$ regardless of positive electrode active material used. However, the effect of $K_2CuO_2$ is less relative to positive electrodes containing $Na_2CuO_2$. Also, it was demonstrated that the content of $K_2CuO_2$ was preferably 2 to 10 wt % with respect to the total weight of positive electrode materials. When the content of $K_2CuO_2$ was 25 wt % or more, a tendency to decrease the energy density was exhibited. It is believed that this is because "a demerit due to a reduction in wherein the negative electrode contains a negative electrode active material having an initial charge/discharge efficiency of 75% or less when charged and discharged by employing metallic Li as a counter electrode,
the positive electrode contains at least one metal oxide (X) represented by $A_xMeO_y$, wherein A is at least one or two species selected from Na and K, Me is at least one or two species selected from Ni and Cu, x satisfies $1.9 \leq x \leq 2.1$, and y satisfies $1.9 \leq y \leq 2.1$,
the metal oxide (X) comprises $Na_2NiO_2$, the positive electrode includes a positive electrode active material (Z), and a content of the metal oxide (X) in the positive electrode is 2 to 20 wt % with respect to the total weight of the positive electrode active material (Z) and the metal oxide (X), and the negative electrode includes a metal oxide (a) capable of absorbing and emitting lithium ions as the negative electrode active material.

2. The nonaqueous electrolytic solution secondary battery of claim 1, wherein the negative electrode includes a carbon material (c) as the negative electrode active material.

3. The nonaqueous electrolytic solution secondary battery of claim 1, wherein the metal oxide (a) is a silicon oxide.

4. The nonaqueous electrolytic solution secondary battery of claim 1, wherein the negative electrode includes a metal (b) capable of forming an alloy with lithium as the negative electrode active material.

5. The nonaqueous electrolytic solution secondary battery of claim 4, wherein the metal (b) is silicon.

6. The nonaqueous electrolytic solution secondary battery of claim 1, wherein the content of the metal oxide (X) in the positive electrode is 2 to 10 wt % with respect to the total weight of the positive electrode active material (Z) and the metal oxide (X).

7. The nonaqueous electrolytic solution secondary battery of claim 1, wherein the metal oxide (X) further comprises $K_2NiO_2$.

8. The nonaqueous electrolytic solution secondary battery of claim 7, wherein the content of the metal oxide (X) in the positive electrode is 2 to 10 wt % with respect to the total weight of the positive electrode active material (Z) and the metal oxide (X).

9. The nonaqueous electrolytic solution secondary battery of claim 1, wherein the metal oxide (X) further comprises $K_2CuO_2$.

10. The nonaqueous electrolytic solution secondary battery of claim 9, wherein the content of the metal oxide (X) in the positive electrode is 2 to 10 wt % with respect to the total weight of the positive electrode active material (Z) and the metal oxide (X).

11. A positive electrode used for a nonaqueous electrolytic solution secondary battery, wherein the positive electrode contains a metal oxide (X) represented by $A_xMeO_y$, wherein A is at least one or two species selected from Na and K, Me is at least one or two species selected from Ni and Cu, x satisfies $1.9 \leq x \leq 2.1$, and y satisfies $1.9 \leq y \leq 2.1$, the metal oxide (X) comprises $Na_2NiO_2$, and the positive electrode includes a positive electrode active material (Z), and a content of the metal oxide (X) in the positive electrode is 2 to 20 wt % with respect to the total weight of the positive electrode active material (Z) and the metal oxide (X).

12. The positive electrode used for a nonaqueous electrolytic solution secondary battery of claim 11, wherein the content of the metal oxide (X) in the positive electrode is 2 to 10 wt % with respect to the total weight of the positive electrode active material (Z) and the metal oxide (X).

13. The positive electrode used for a nonaqueous electrolytic solution secondary battery of claim 11, wherein the metal oxide (X) further comprises $K_2NiO_2$.

14. The positive electrode used for a nonaqueous electrolytic solution secondary battery of claim 13, wherein the content of the metal oxide (X) in the positive electrode is 2 to 10 wt % with respect to the total weight of the positive electrode active material (Z) and the metal oxide (X).

15. The positive electrode used for a nonaqueous electrolytic solution secondary battery of claim 11, wherein the metal oxide (X) further comprises $K_2CuO_2$.

16. The positive electrode used for a nonaqueous electrolytic solution secondary battery of claim 15, wherein the content of the metal oxide (X) in the positive electrode is 2 to 10 wt % with respect to the total weight of the positive electrode active material (Z) and the metal oxide (X).

17. A negative electrode used for a nonaqueous electrolytic solution secondary battery, wherein the negative electrode contains a negative electrode active material having an initial charge/discharge efficiency of 75% or less when charged and discharged by employing metallic Li as a counter electrode, the negative electrode being obtained by charging with a positive electrode containing a metal oxide (X) represented by $A_xMeO_y$, wherein A is at least one or two species selected from Na and K, Me is at least one or two species selected from Ni and Cu, x satisfies $1.9 \leq x \leq 2.1$, and y satisfies $1.9 \leq y \leq 2.1$ as a counter electrode, the metal oxide (X) comprises $Na_2NiO_2$, the positive electrode includes a positive electrode active material (Z), and a content of the metal oxide (X) in the positive electrode is 2 to 20 wt % with respect to the total weight of the positive electrode active material (Z) and the metal oxide (X), and the negative electrode includes a metal oxide (a) capable of absorbing and emitting lithium ions as the negative electrode active material.

18. The negative electrode used for a nonaqueous electrolytic solution secondary battery of claim 17, wherein the negative electrode includes a carbon material (c) as the negative electrode active material.

19. The negative electrode used for a nonaqueous electrolytic solution secondary battery of claim 17, wherein the metal oxide (a) is a silicon oxide.

20. The negative electrode used for a nonaqueous electrolytic solution secondary battery of claim 17, wherein the negative electrode includes a metal (b) capable of forming an alloy with lithium as the negative electrode active material.

21. The negative electrode used for a nonaqueous electrolytic solution secondary battery of claim 20, wherein the metal (b) is silicon.

22. A nonaqueous electrolytic solution secondary battery comprising a positive electrode and a negative electrode, wherein the negative electrode contains a negative electrode active material having an initial charge/discharge efficiency of 75% or less when charged and discharged by employing metallic Li as a counter electrode, the positive electrode contains a metal oxide (X) represented by $A_xMeO_y$, wherein A is at least one or two species selected from Na and K, Me is at least one or two species selected from Ni and Cu, x satisfies $1.9 \leq x \leq 2.1$, and y satisfies $1.9 \leq y \leq 2.1$, the metal oxide (X) comprises $Na_2CuO_2$, and the positive electrode includes a positive electrode active material (Z), and a content of the metal oxide (X) in the positive electrode is 2 to 15 wt % with respect to the total weight of the positive electrode active material (Z) and the metal oxide (X).

23. A positive electrode used for a nonaqueous electrolytic solution secondary battery, wherein the positive electrode contains a metal oxide (X) represented by $A_xMeO_y$, wherein A is at least one or two species selected from Na and K, Me is at least one or two species selected from Ni and Cu, x satisfies $1.9 \leq x \leq 2.1$, and y satisfies $1.9 \leq x \leq 2.1$, the metal oxide (X) comprises $Na_2CuO_2$, and the positive electrode includes a positive electrode active material (Z), and a content of the metal oxide (X) in the positive electrode is 2 to 15 wt % with respect to the total weight of the positive electrode active material (Z) and the metal oxide (X).

24. A negative electrode used for a nonaqueous electrolytic solution secondary battery, wherein the negative electrode contains a negative electrode active material having an initial charge/discharge efficiency of 75% or less when charged and discharged by employing metallic Li as a counter electrode, the negative electrode being obtained by charging with a positive electrode containing a metal oxide (X) represented by $A_xMeO_y$, wherein A is at least one or two species selected from Na and K, Me is at least one or two species selected from Ni and Cu, x satisfies $1.9 \leq x \leq 2.1$, and y satisfies $1.9 \leq x \leq 2.1$, as a counter electrode, the metal oxide (X) comprises $Na_2CuO_2$, the positive electrode includes a positive electrode active material (Z), and a content of the metal oxide (X) in the positive electrode is 2 to 15 wt % with respect to the total weight of the positive electrode active material (Z) and the metal oxide (X).

\* \* \* \* \*